United States Patent
Ahn et al.

(10) Patent No.: US 7,580,734 B2
(45) Date of Patent: Aug. 25, 2009

(54) SWING-TYPE PORTABLE COMMUNICATION APPARATUS

(75) Inventors: Chi-Young Ahn, Seoul (KR); Young S. Kim, Los Altos, CA (US); Chang-Hwan Hwang, Goyang-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/123,319

(22) Filed: May 6, 2005

(65) Prior Publication Data

US 2005/0266898 A1 Dec. 1, 2005

Related U.S. Application Data

(60) Provisional application No. 60/568,970, filed on May 6, 2004, provisional application No. 60/622,564, filed on Oct. 26, 2004.

(30) Foreign Application Priority Data

Apr. 4, 2005 (KR) ............... 10-2005-0028254

(51) Int. Cl.
*H04M 1/00* (2006.01)
(52) U.S. Cl. ............... 455/575.1; 455/575.3; 455/566
(58) Field of Classification Search .... 455/575.1–575.4
See application file for complete search history.

(56) References Cited

U.S. PATENT DOCUMENTS 7,050,767 B2 * 5/2006 Hickey et al. ............ 455/90.3
2002/0187818 A1 * 12/2002 Kang ..................... 455/575
2003/0013417 A1 * 1/2003 Bum ...................... 455/90
2003/0044001 A1 3/2003 Kim
2003/0087609 A1 5/2003 Cheng
2003/0114198 A1 * 6/2003 Han ....................... 455/566
2003/0203747 A1 * 10/2003 Nagamine ............... 455/575.3
2004/0132482 A1 * 7/2004 Kang et al. .............. 455/550.1
2004/0185921 A1 * 9/2004 Tornaghi ................. 455/575.1
2004/0209641 A1 * 10/2004 Hong ..................... 455/550.1
2004/0229662 A1 * 11/2004 Chadha .................. 455/575.1
2005/0009571 A1 * 1/2005 Chiam et al. ............. 455/566
2005/0137001 A1 * 6/2005 Bell et al. ................ 455/575.4

FOREIGN PATENT DOCUMENTS

| CN | 1404284 | 3/2003 |
|----|---------|--------|
| EP | 1 542 433 | 6/2005 |
| JP | 2000278659 | 10/2000 |
| JP | 2002057771 | 2/2002 |
| KR | 1020050100928 | 10/2005 |
| WO | WO 03/019911 | 3/2003 |

* cited by examiner

*Primary Examiner*—Lester Kincaid
*Assistant Examiner*—Steven Lim
(74) *Attorney, Agent, or Firm*—The Farrell Law Firm, LLP (57) ABSTRACT

Disclosed is a portable communication apparatus. The portable communication apparatus includes a main housing having an upper surface divided into a first area including a first key array having a plurality of keys and a second area aligned downwardly from the first area, and a swing housing provided at an upper surface thereof with a display unit and aligned in the second area while facing the second area in order to selectively open or close the second area.

13 Claims, 7 Drawing Sheets

SWING-TYPE PORTABLE COMMUNICATION APPARATUS

PRIORITY

This application claims the benefit under 35 U.S.C. 119(a) of an application entitled "Swing-Type Portable Communication Apparatus" filed with the United States Patent and Trademark Office on May 6, 2004 and assigned Ser. No. U.S. 60/568,970, an application entitled the same filed with the United States Patent and Trademark Office on Oct. 26, 2004 and assigned Ser. No. U.S. 60/622,564, and an application entitled the same filed with Korean Intellectual Property Office on Apr. 4, 2005 and assigned Serial No. 2005-28254, the contents of each of which are incorporated herein by reference.

BACKGROUND OF THE INVENTION

1. Field of the Invention

The present invention relates to a digital portable communication apparatus, such as a cellular phone, a PDA (personal digital assistant), an HHP (handheld phone), a camera phone, a game phone, or a portable phone having a TV function. More particularly, the present invention relates to a portable communication apparatus suitable for providing users with broadcasting, e-mail, chatting and game services.

2. Description of the Related Art

In general, "portable communication apparatuses" refer to electronic appliances that allow users to communication with other users over a wireless network. In consideration of portability, designs of such portable communication apparatuses tend to be compact, slim, and light, while also providing a wider variety of functions including multimedia functionality. Future portable communication apparatuses are expected to incorporate even greater multi-functionality and multi-purpose utilization, as well as being even more compact and light. The portable communication apparatuses will likely be modified for various multimedia environments or Internet environments. Such portable communication apparatuses are now commonly used by all kinds of people including, men and women, the young and old, throughout the world, and are recognized as a nearly indispensable commodity which must be carried always.

Conventional portable communication apparatuses may be classified into various types according to appearance. For example, portable communication apparatuses are classified into bar-type portable communication apparatuses, flip-type portable communication apparatuses and folder-type portable communication apparatuses. In addition, the portable communication apparatuses can be classified into neck wearable-type and wrist-type portable according to their positions when worn on a human body. Further, the portable communication apparatuses may be classified into rotation-type portable communication apparatuses and sliding-type portable communication apparatuses according to ways of opening and closing the portable communication apparatuses. These variously classified portable communication apparatuses can be easily understood by those skilled in the art.

Modern portable communication apparatuses transmit data at a high rate in addition to voice communication. In response to consumer demand, portable communication apparatuses provide consumers with various services by using wireless communication technology capable of high speed data transfer.

Current design trends include a camera lenses for transmitting an image signal. Current portable communication apparatus models may have internal or external camera lens modules for video, or image communication or to photograph desired subjects.

Among the conventional portable communication apparatuses, the swing-type portable communication apparatus includes two housings coupled to each other while facing each other in such a manner that one housing can be opened or closed according to the swinging action of the other. Although the conventional swing-type portable communication apparatus has a display unit and a plurality of keys, since it is not equipped with a wide-screen viewing function, the user may feel inconvenienced when viewing the image displayed in the display unit or when manipulating the keys. If the portable communication apparatus is to provide users with various image-communication, game, music, broadcasting, VOD, chatting, and Internet services in various multimedia environments, the user should be able to use the display as a widescreen. Thus, the portable communication apparatus must be suitable for various user-interfacing environments.

Therefore, it is necessary to set the user interfacing environment of the portable communication apparatus in such a manner that the user can conveniently input/output data into/from the portable communication apparatus. In addition, it is necessary to provide a swing-type portable communication apparatus allowing the user to easily manipulate a display unit and keys thereof.

SUMMARY OF THE INVENTION

Accordingly, the present invention has been made to solve the above-mentioned problems occurring in the prior art, and an object of the present invention is to provide a swing-type portable communication apparatus equipped with a wide-screen-viewing function for a display unit.

Another object of the present invention is to provide a swing-type portable communication apparatus capable of allowing users to conveniently use broadcasting, e-mail, chatting and game services.

Still another object of the present invention is to provide a swing-type portable communication apparatus capable of protecting a camera lens assembly when the camera lens assembly is not used.

Still yet another object of the present invention is to provide a swing-type portable communication apparatus equipped with a widescreen-viewing function for a display while allowing users to conveniently manipulate keys with both hands.

In order to accomplish these objects, according to one aspect of the present invention, there is provided a portable communication apparatus including a main housing having an upper surface divided into a first area including a first key array having a plurality of keys and a second area aligned downwardly from the first area; and a swing housing provided at an upper surface thereof with a display unit and aligned in the second area while facing the second area in order to selectively open or close the second area.

According to another aspect of the present invention, there is provided a portable communication apparatus comprising: a main housing having an upper surface divided into a first area including a first key array having a plurality of keys, a second area aligned downwardly from the first area, and a stepped portion formed between the first and second areas; and a swing housing provided at an upper surface thereof with a display unit and aligned in the second area while facing the second area in order to selectively open or close the second area, wherein the display unit is aligned in a widescreen-viewing position in a first position of the swing housing and first and second key arrays are aligned at both sides of the display unit in a second position of the swing housing.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the following description of the present invention, a detailed description of known functions and configurations incorporated herein will be omitted when it may make the subject matter of the present invention unclear.

Figure 1:
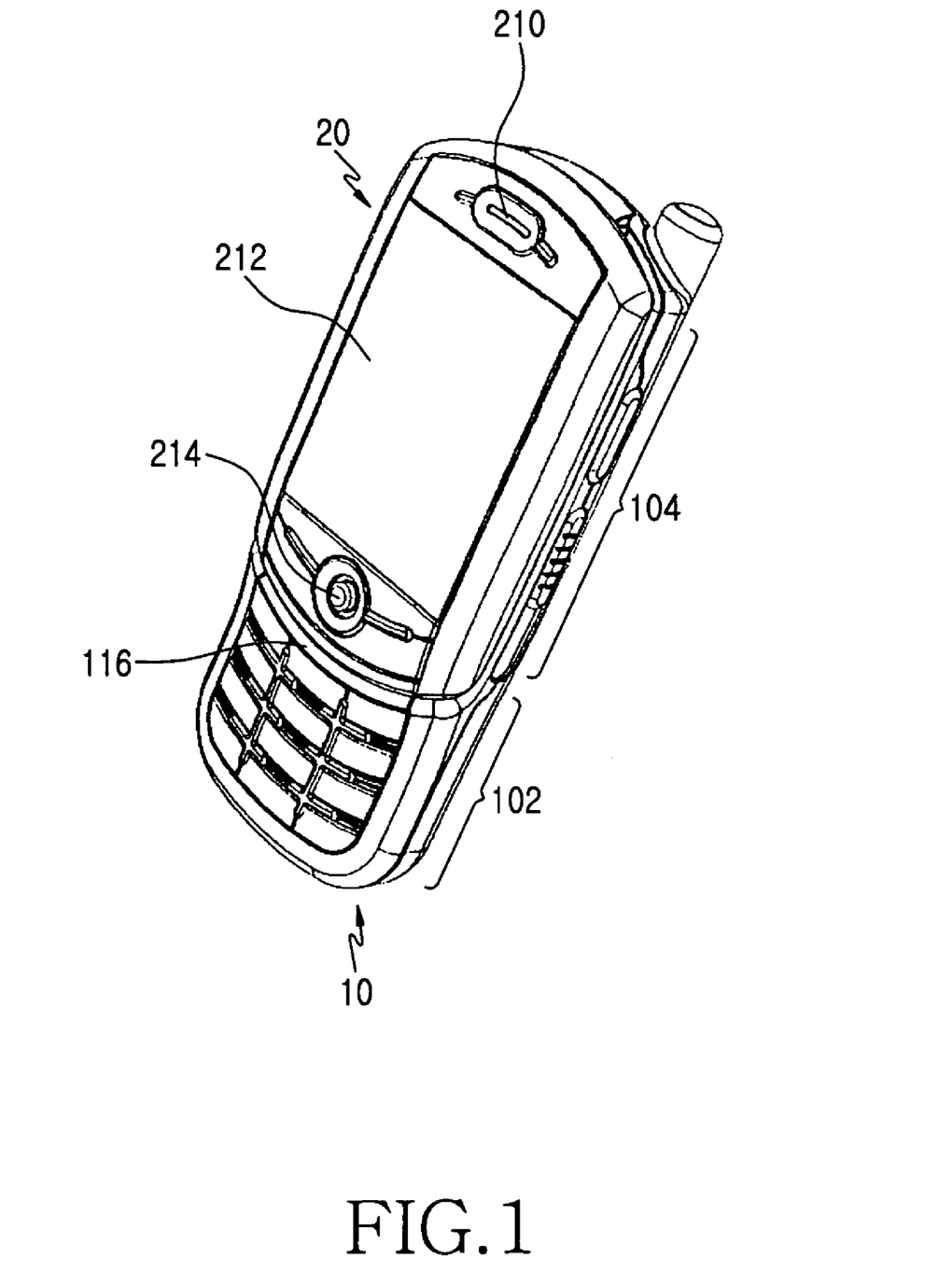
FIG. 1 is a perspective view illustrating a swing-type portable communication apparatus in a communication mode according to a first embodiment of the present invention.
Figure 2:
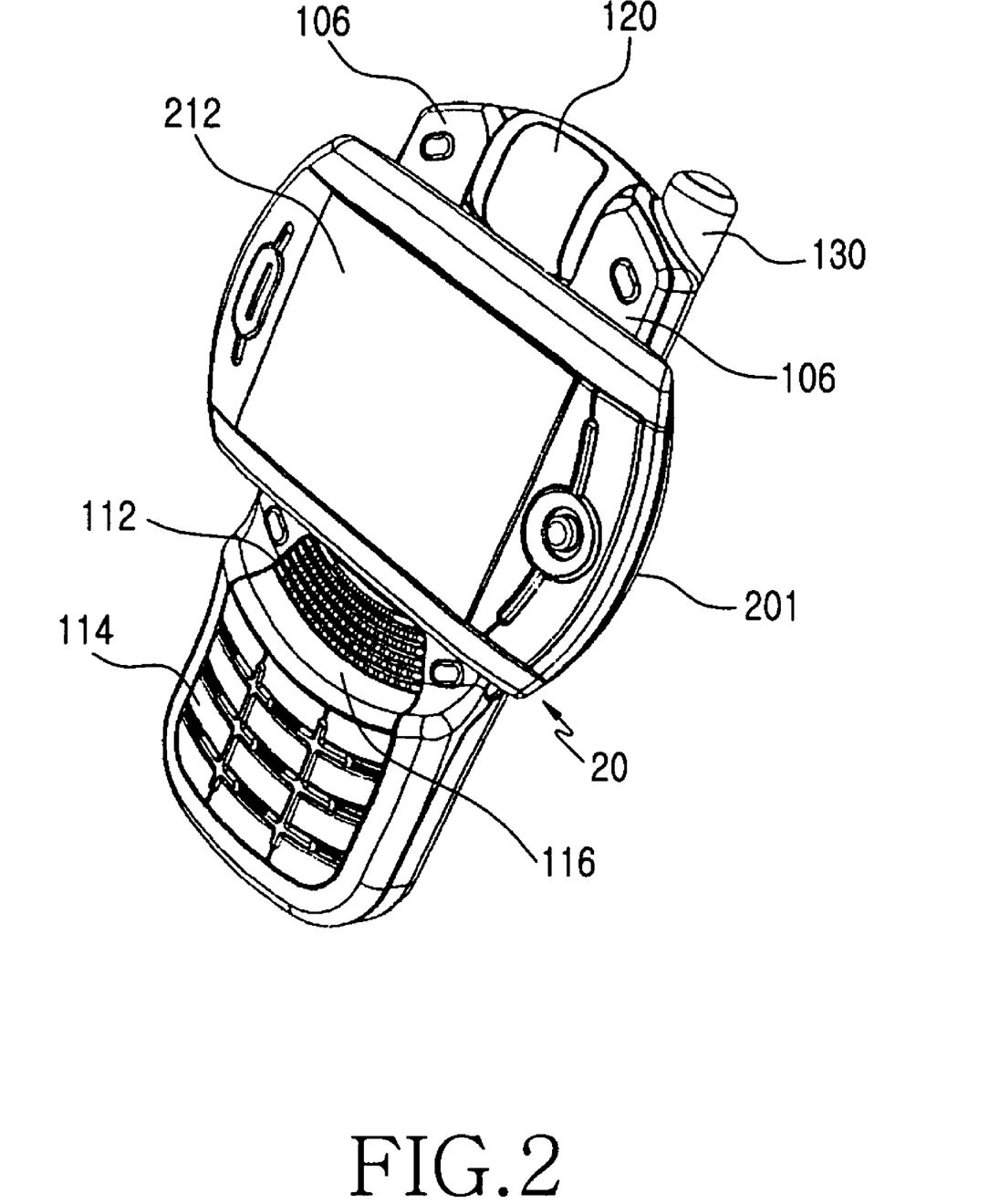
FIG. 2 is a perspective view illustrating the swing-type portable communication apparatus of FIG. 1 in a camera mode, in which a swing housing is rotated at a right angle for a broadcasting service or a VOD services.
Figure 3:
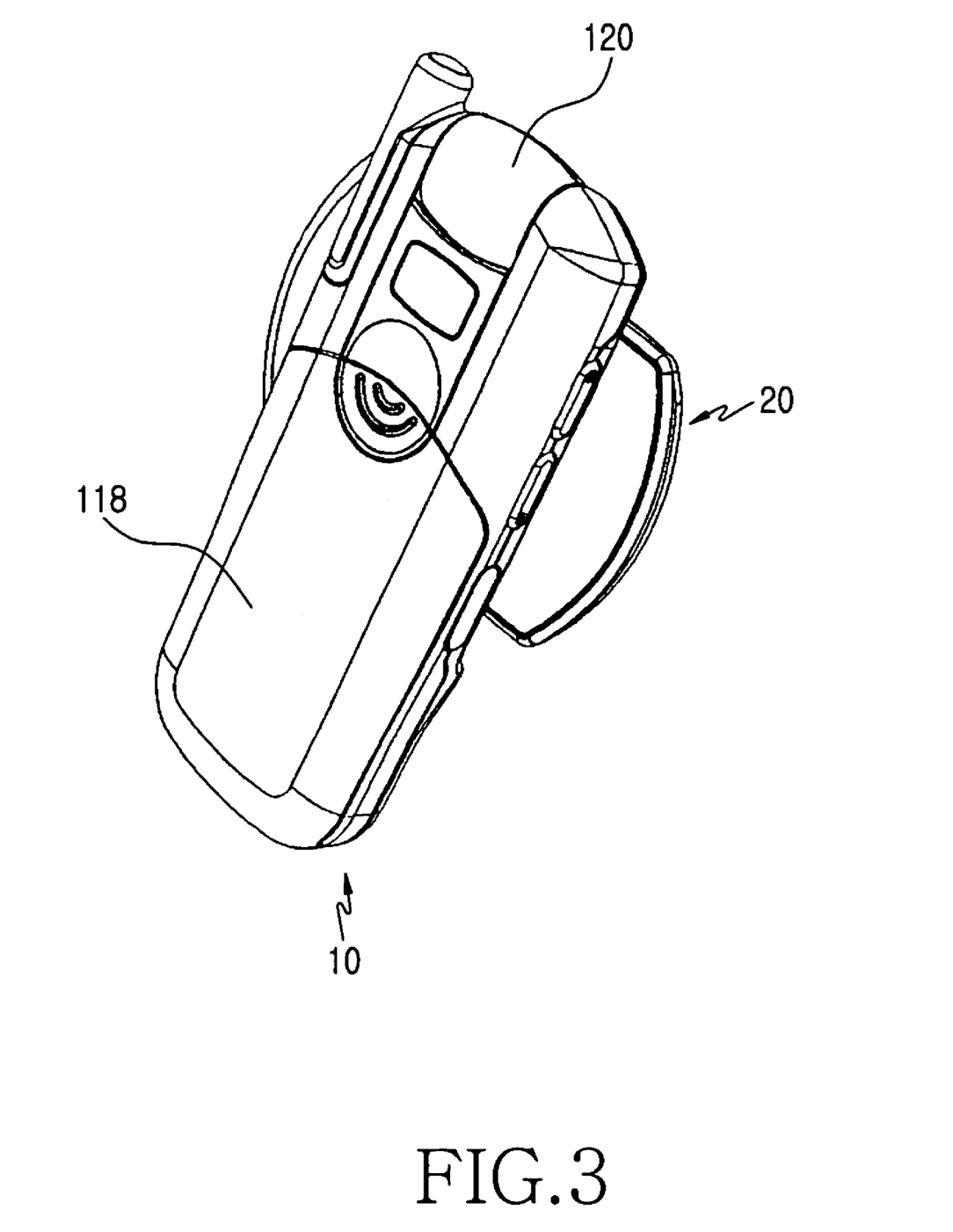
FIG. 3 is a perspective view illustrating a bottom portion of the swing-type portable communication apparatus of FIG. 2.

FIGS. 1 to 3 show a swing-type portable communication apparatus according to a first embodiment of the present invention. The swing-type portable communication apparatus according to the first embodiment of the present invention includes a main housing 10 and a swing housing 20. The main housing 10 and the swing housing 20 preferably have plate shapes. The swing housing 20 swings within a predetermined angle relative to the main housing 10 while facing the main housing 10, thereby opening/closing an upper surface section of the main housing 10.

The upper surface section of the main housing 10 is divided into first and second areas 102 and 104. The first area 102 is exposed regardless of the swing action of the swing housing 20 and the second area 104 is selectively opened or closed according to the swing action of the swing housing 20. The swing housing 20 is provided in the second area 104 of the main housing 10 and swings relative to the second area 104 of the main housing 10. The first and the second areas 102 and 104 are aligned in a stepped pattern. In detail, the second area 104 is positioned downwardly from the first area 102. Thus, a stepped portion 116 is formed between the first and the second areas 102 and 104.

A first key array 114 including a plurality of keys is aligned in the first area 102 in such a manner that the first key array 114 can be exposed to the exterior. A display unit 212 is provided on an upper surface of the swing housing 20 such that the display unit 212 can be exposed to the exterior. A first speaker unit 210 is installed adjacent to the display unit 212 and a second speaker unit 112 is provided in the second area 104 in such a manner that the second speaker unit 112 can be selectively exposed to the exterior according to the swing action of the swing housing 20. In addition, a four-way key 214 is positioned below the display unit 212 so that the user can select and execute desired data by using the four-way key 214. The second speaker unit 112 is positioned at a lower portion of the second area 104 and a camera lens assembly 120 is installed at an upper portion of the second area 104. Preferably, the second speaker unit 112 generates stereoscopic sound.

The swing housing 20 has an upper end and a lower end 201 formed with a first curvature. The stepped portion 116 corresponding to the lower end 201 of the swing housing 20 is formed with a second curvature. In order to facilitate the swing action of the swing housing 20, the first curvature matches with the second curvature. In addition, the upper end of the swing housing 20 has a curvature corresponding to the first curvature of the lower end of the swing housing 20, so the swing housing 20 is symmetrically formed about the display unit 212.

As shown in FIG. 2, a pair of support arms 106 are provided at an upper portion of the second area 104 of the main housing 10 and the camera lens assembly 120 is rotatably aligned between the support arms 106. The camera lens assembly 120 is selectively opened or closed by means of the swing housing 20 according to the swing action of the swing housing 20. A hinge axis of the camera lens assembly 120 is spaced apart from a swing axis of the swing housing 20 by a predetermined distance and extends perpendicularly to the swing axis of the swing housing 20. The camera lens assembly 120 can rotate within an angle of 360 degrees so that a camera lens of the camera lens assembly 120 can be directed towards the second area 104 or the lower side of the main housing 10. Although it is illustrated that the camera lens assembly 120 is installed on the upper portion of the second area 104, it is also possible to install the camera lens assembly 120 at the upper end or the lower end of the swing housing 20.

As shown in FIG. 3, a detachable battery pack 118 is provided at a bottom surface of the main housing 10. The battery pack 118 is a rechargeable battery pack, so the user can recharge the battery pack 119 if necessary. In addition, as shown in FIG. 2, an antenna device 130 is installed at one edge portion of the main body 10.

FIG. 1 illustrates the swing-type portable communication apparatus in the communication mode and FIG. 2 illustrates the swing-type portable communication apparatus in which the swing housing 20 has been rotated at a right angle so that the display unit 212 is aligned in a widescreen-viewing position. If the display unit 212 is aligned in the widescreen-viewing position, the user can conveniently use the e-mail, broadcasting, VOD, and game services. When the user uses the broadcasting service or the game service while aligning the display unit 212 in the widescreen-viewing position as shown in FIG. 2, the second speaker unit preferably generates stereoscopic sound. In addition, when the camera lens assembly 120 is not used, the camera lens assembly 120 is protected by means of the swing housing 20 as shown in FIG. 1.

Meanwhile, the swing housing 20 can automatically, manually, or semi-automatically swing relative to the main housing 10. To allow the swing housing 20 to automatically swing relative to the main housing 10, a motor and a reduction module connected to the motor can be used. The reduction module includes a gear train capable of reducing the rotational speed of a motor shaft of the motor. To allow the swing housing 20 to semi-automatically swing relative to the main housing 10, an elastic member can be used. In addition, although FIG. 2 shows the swing housing 20, which has been rotated counterclockwise at the right angle relative to the main housing 10, the swing housing 20 can rotate clockwise at an angle above 90 degrees relative to the main housing 10. In addition, it is not necessary to fabricate the camera lens assembly 120 with a cylindrical structure. The present invention does not limit the structure of the camera lens assembly 120 if the camera lens assembly 120 does not interrupt the swing action of the swing housing 20. For instance, the camera lens assembly 120 can be fabricated with a flat plate structure as shown in FIGS. 2 and 3.

Preferably, the upper end of the main housing 10, in which the support arms 106 and the camera lens assembly 120 are installed, has a curvature corresponding to the curvature of the upper end or the lower end 201 of the swing housing 20.

FIGS. 4 to 7 show a swing-type portable communication apparatus according to a second embodiment of the present invention. The swing-type portable communication apparatus according to the second embodiment includes a main housing 30 and a swing housing 40. The main housing 30 and the swing housing 40 preferably have plate shapes. The swing housing 40 swings within an angle of 180 degrees relative to the main housing 30 while facing the main housing 30, thereby opening/closing an upper surface section of the main housing 30. According to the second embodiment, a display unit 412 is aligned in a widescreen-viewing position when the swing housing 40 is in a first position, wherein the swing housing 40 has been rotated at a right angle relative to the main housing 30.

Figure 6:
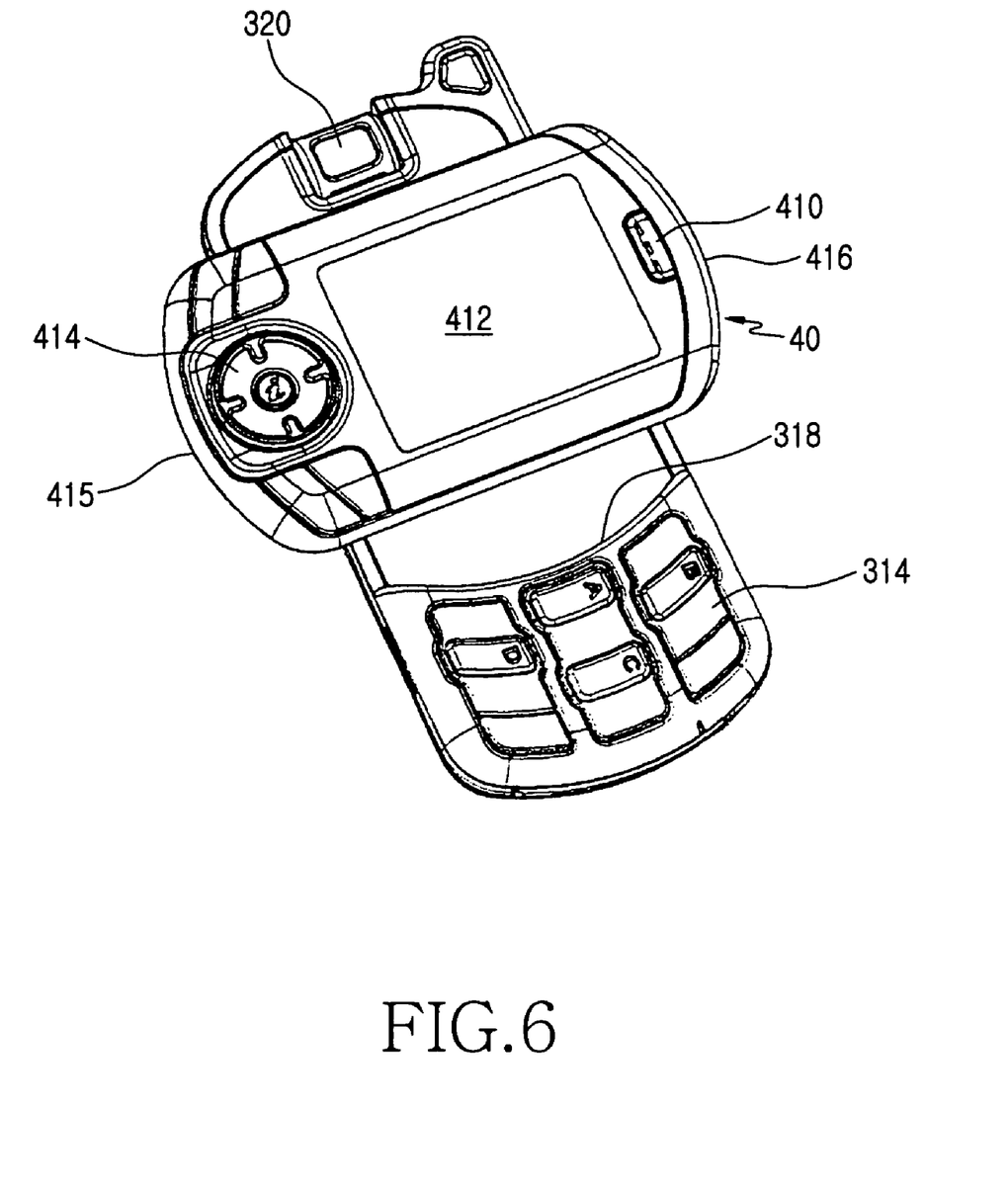
FIG. 6 is a perspective view of the swing-type portable communication apparatus of FIG. 4 in a camera mode, in which a swing housing is rotated at a right angle for a broadcasting service or a VOD services.
Figure 7:
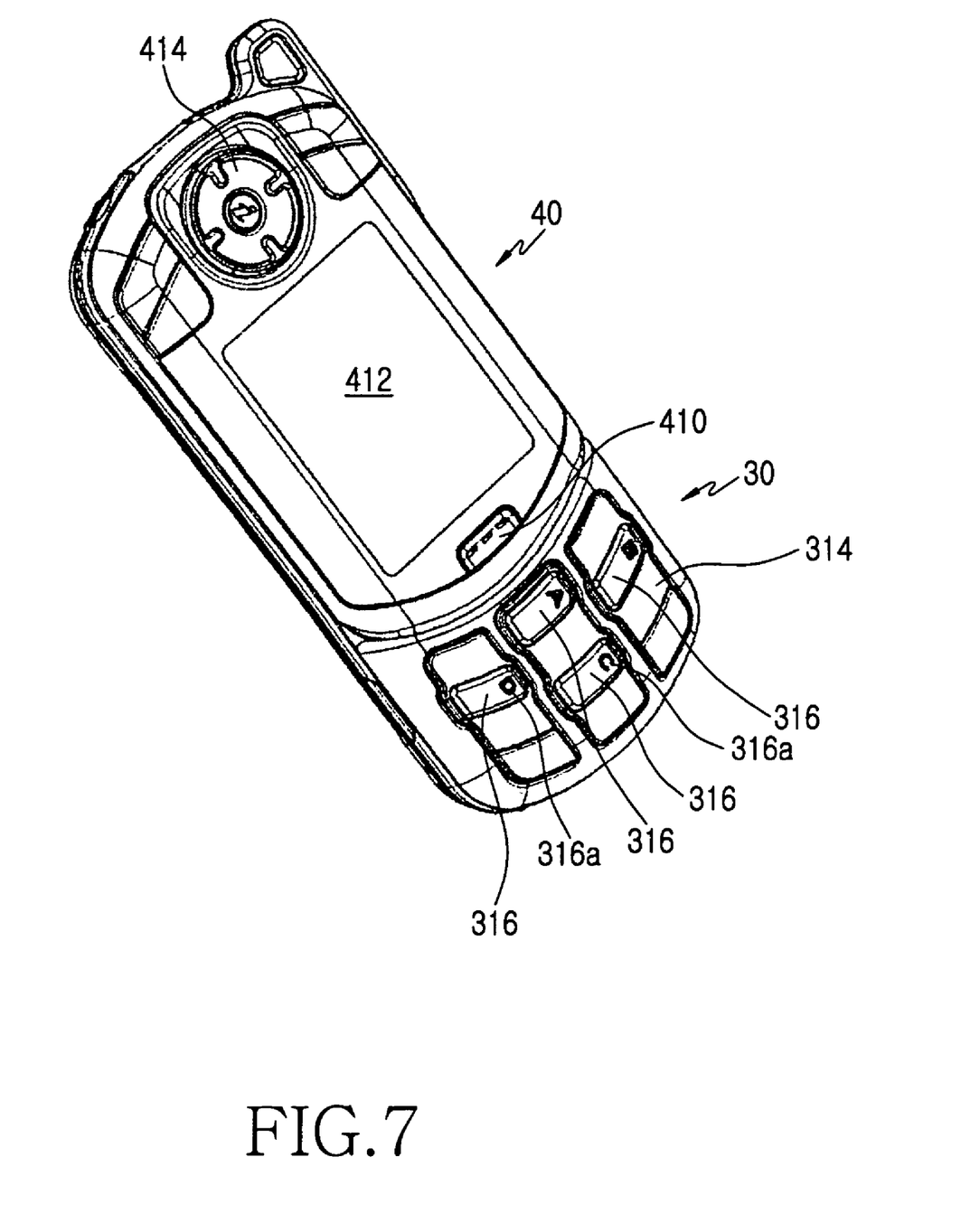
FIG. 7 is a perspective view of the swing-type portable communication apparatus of FIG. 4 in a chatting mode or a game mode, in which a swing housing is rotated at an angle of 180 degrees for allowing a user to conveniently manipulate keys with both hands.

In addition, key arrays 314 and 414 are aligned symmetrically to each other about the display unit 412 when the swing housing 40 is in a second position, wherein the swing housing 40 has been rotated at an angle of 180 degrees relative to the main housing 30, as shown in FIG. 7. If the swing housing 40 is in the second position, the user can conveniently manipulate the key arrays 314 and 414 with both hands. FIG. 6 shows the first position of the swing housing 40 and FIG. 7 shows the second position of the swing housing 40.

The upper surface section of the main housing 30 is divided into first and second areas 304 and 302. The first area 304 is exposed to an exterior regardless of the swing action of the swing housing 40 and the second area 302 is selectively opened or closed according to the swing action of the swing housing 40. The swing housing 40 is provided in the second area 302 of the main housing 30 and swings relative to the second area 302 of the main housing 30. The first and the second areas 304 and 302 are aligned in a stepped pattern. In detail, the second area 302 is positioned downwardly from the first area 304. Thus, a stepped portion 318 is formed between the first and the second areas 304 and 302.

A first key array 314 including a plurality of keys is aligned in the first area 304 in such a manner that the first key array 314 can be exposed to the exterior. The display unit 412 is provided on an upper surface of the swing housing 40 such that the display unit 412 can also be exposed to the exterior. A first speaker unit 410 is installed adjacent to the display unit 412 and a four-way key 414 is positioned below the display unit 412 so that the user can select and execute desired data by using the four-way key 414. A camera lens assembly 320 is installed at an upper portion of the second area 302.

Figure 4:
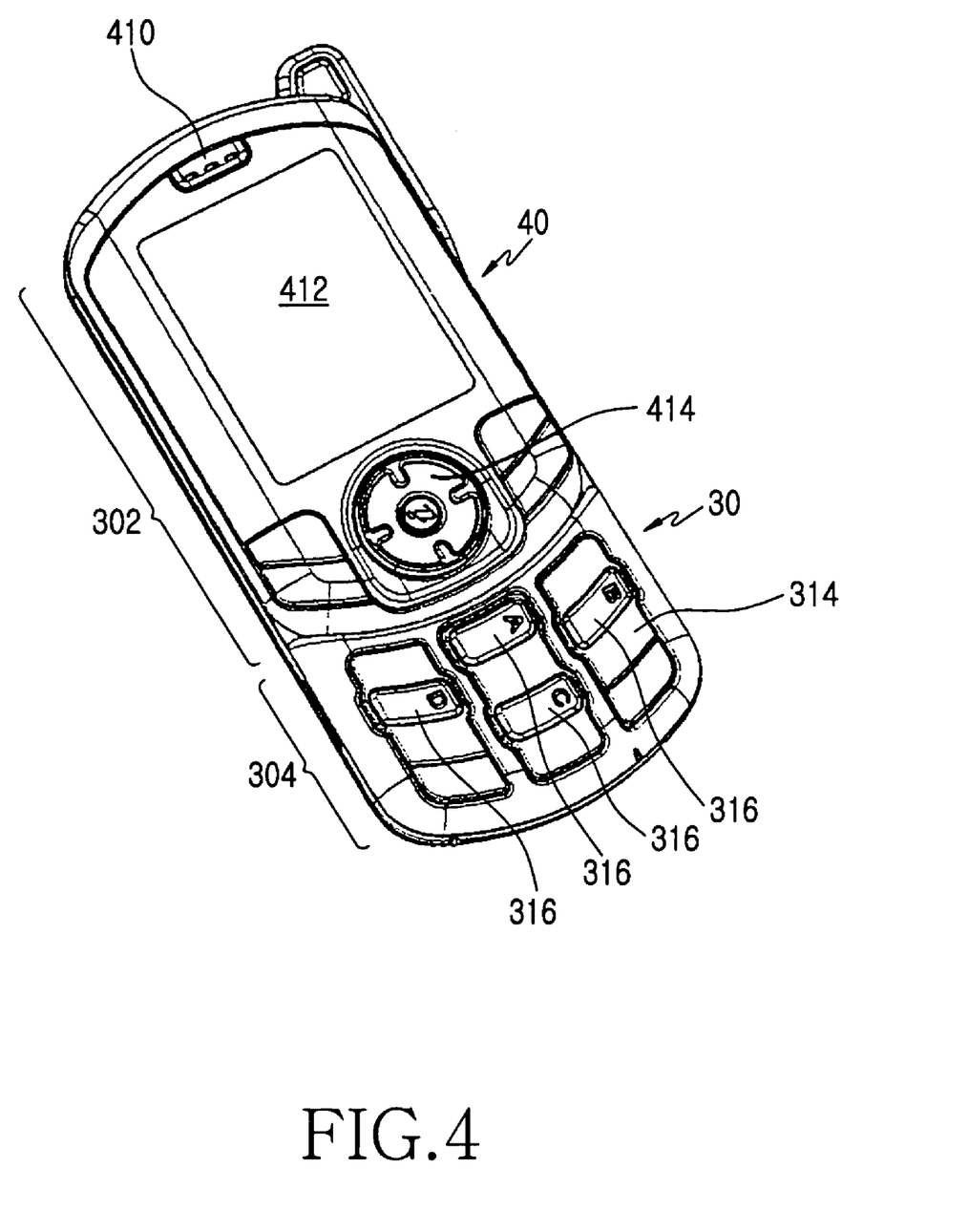
FIG. 4 is a perspective view illustrating a swing-type portable communication apparatus according to a second embodiment of the present invention.

The first key array 314 is positioned in the first area 304. As shown in FIGS. 4 and 7, keytops 316a having a predetermined thickness are attached to upper surfaces of predetermined keys 316 of the first key array 314. Preferably, four keytops 316a are provided on upper surfaces of four keys 316 aligned in four directions, respectively. Numbers or characters are printed on the upper surfaces of the keytops 316. At this time, as shown in FIG. 7, the number or characters are aligned suitable for the widescreen-viewing position of the display unit 412 in order to allow the user to conveniently manipulate the keys with both hands when using the chatting service or the game service.

The swing housing 40 has an upper end 416 and a lower end 415. The lower end 415 of the swing housing 40 has a first curvature and the upper end 416 of the swing housing 40 has a second curvature. In addition, the stepped portion 318 corresponding to the lower end 415 of the swing housing 40 is formed with a third curvature. In order to facilitate the swing action of the swing housing 40, the first curvature matches with the second curvature. In addition, the third curvature preferably matches with the first curvature.

As shown in FIG. 6, the camera lens assembly 320 is rotatably installed at the upper end portion of the second area 302 of the main housing 30. The camera lens assembly 320 is selectively opened or closed by means of the swing housing 40 according to the swing action of the swing housing 40. A hinge axis of the camera lens assembly 320 is spaced apart from a swing axis of the swing housing 40 by a predetermined distance and extends perpendicularly to the swing axis of the swing housing 40. The camera lens assembly 320 can rotate within an angle of 360 degrees so that a camera lens of the camera lens assembly 320 can be directed towards the second area 302 or the lower side of the main housing 30. Although it is illustrated that the camera lens assembly 320 is installed on the upper portion of the second area 104, the present invention does not limit the installation position of the camera lens assembly 320. For instance, the camera lens assembly 320 can be installed at the upper end or the lower end of the swing housing 40.

Figure 5:
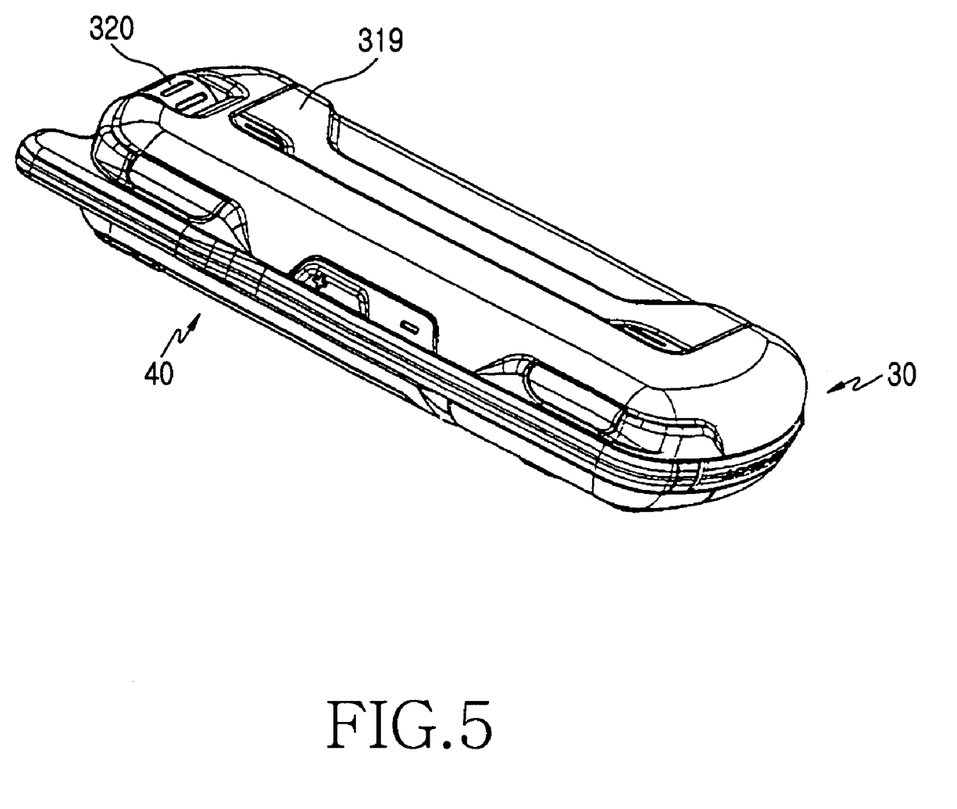
FIG. 5 is a perspective view illustrating a bottom portion of the swing-type portable communication apparatus of FIG. 4.

As shown in FIG. 5, a detachable battery pack 319 is provided at a bottom surface of the main housing 30. The battery pack 319 is a rechargeable battery pack, so the user can recharge the battery pack if necessary.

FIG. 5 illustrates the swing-type portable communication apparatus in the communication mode and FIG. 2 shows the swing-type portable communication apparatus in which the swing housing 40 has been rotated at a right angle so that the display unit 412 is aligned in a widescreen-viewing position. If the display unit 412 is aligned in the widescreen-viewing position, the user can conveniently use the e-mail, broadcasting, VOD, and game services. Preferably, the user aligns the display unit 412 in the widescreen-viewing position as shown in FIG. 7 when using the chatting service or the game service. In addition, when the camera lens assembly 320 is not used, the camera lens assembly 320 is protected by means of the swing housing 40 as shown in FIG. 5.

The swing housing 40 can automatically, manually, or semi-automatically swing relative to the main housing 30. To allow the swing housing 40 to automatically swing relative to the main housing 30, a motor and a reduction module connected to the motor can be used. In order to allow the swing housing 40 to semi-automatically swing relative to the main housing 30, an elastic member can be used. In addition, although FIG. 6 shows the swing housing 40, which has been rotated counterclockwise at the right angle relative to the main housing 30, the swing housing 40 can rotate clockwise at an angle of above 90 degrees relative to the main housing 30. In addition, it is not necessary to fabricate the camera lens assembly 320 with a cylindrical structure. The present invention does not limit the structure of the camera lens assembly 320 if the camera lens assembly 320 does not interrupt the swing action of the swing housing 40. For instance, the camera lens assembly 320 can be fabricated with a flat plate structure.

As described above, according to the present invention, the user can view the image displayed in the display unit while aligning the display unit in the widescreen-viewing position, so the user can conveniently use the broadcasting and VOD services. In particular, since the user can easily manipulate the keys with one hand or both hands, the user can conveniently use the chatting and game services. In addition, the camera lens assembly can be protected when the camera lens assembly is not used. In each embodiment, the swing housing rotates about the swing housing center, i.e., the center point of the swing housing.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A portable communication apparatus comprising:
a main housing having an upper surface divided into a first area including a first key array having a plurality of keys and a second area aligned adjacent to and stepped from the first area, the first key array being always exposed, the second area receiving a speaker unit; and
a swing housing rotatably connected to the main housing in the second area, the swing housing including a display unit and a second key array adjacent to the display unit, both the display unit and the second key array being always exposed.

2. The portable communication apparatus as claimed in claim 1, wherein a lower end portion of the swing housing has a first curvature, and a stepped portion formed between the first and second areas of the main housing has a second curvature corresponding to the first curvature.

3. The portable communication apparatus as claimed in claim 1, wherein the swing housing has a first speaker unit aligned adjacent to the display unit and the speaker unit of the second area is selectively opened or closed according to swing action of the swing housing.

4. The portable communication apparatus as claimed in claim 1, wherein the second key array comprises a four-way key adjacent to the display unit.

5. The portable communication apparatus as claimed in claim 1, wherein a pair of support arms are provided at an upper end portion of the main housing and a camera lens assembly is rotatably installed between the support arms in such a manner that the camera lens assembly is directed towards a lower portion of the main housing.

6. The portable communication apparatus as claimed in claim 5, wherein the camera lens assembly is rotatably installed and selectively opened or closed by means of the swing housing according to swing action of the swing housing.

7. The portable communication apparatus as claimed in claim 1, wherein the swing housing is longitudinally symmetrically formed about the display unit.

8. The portable communication apparatus as claimed in claim 1, wherein the swing housing forms a cross together with the main housing when the swing housing rotates at a right angle relative to the main housing.

9. A portable communication apparatus comprising:
a main housing having an upper surface divided into a first area including a first key array having a plurality of keys, a second area aligned adjacent to the first area, and a stepped portion is formed between the first and second areas, the second area receiving a sneaker unit; and
a swing housing rotatably connected to the main housing, the swing housing including a display unit and a second key array and aligned in the second area while facing the second area in order to selectively open or close the second area, both the display unit and the second key array being always exposed, wherein the display unit is aligned in a widescreen-viewing position in a first position of the swing housing and the first and second key arrays are aligned at opposite sides of the display unit in a second position of the swing housing.

10. The portable communication apparatus as claimed in claim 9, wherein the swing housing has been rotated at a right angle in the first position, and the swing housing has been rotated at an angle of 180 degrees in the second position.

11. The portable communication apparatus as claimed in claim 9, wherein an upper end portion of the swing housing has a first curvature and a lower end portion of the swing housing has a second curvature corresponding to the first curvature.

12. The portable communication apparatus as claimed in claim 9, further comprising keytops having a predetermined thickness and being attached to upper surfaces of keys selected from the first key array.

13. The portable communication apparatus as claimed in claim 12, wherein the keytops are provided on upper surfaces of four keys aligned in four directions, respectively, numbers or characters are printed on upper surfaces of the keytops, and the numbers or characters are aligned suitable for a widescreen-viewing position of the display unit.

* * * * *